(12) United States Patent
Crouse et al.

(10) Patent No.: US 6,379,028 B1
(45) Date of Patent: Apr. 30, 2002

(54) SUPPLEMENTAL REVERSE LIGHTING APPARATUS FOR MOTOR VEHICLES

(75) Inventors: Charles R. Crouse, Wake Forest; Roger M. Byers, Dana, both of NC (US)

(73) Assignee: Byers Precision Fabricators, Inc., Hendersonville, NC (US)

( * ) Notice: Subject to any disclaimer, the term of this patent is extended or adjusted under 35 U.S.C. 154(b) by 0 days.

(21) Appl. No.: 09/579,260

(22) Filed: May 25, 2000

(51) Int. Cl.[7] ................................................ B60Q 1/00
(52) U.S. Cl. ...................................... 362/485; 362/549
(58) Field of Search ................................. 362/485, 505, 362/543, 549; 340/431, 472; 280/DIG. 14, 504; D12/162

(56) References Cited

U.S. PATENT DOCUMENTS

| | | | |
|---|---|---|---|
| 2,912,675 A | | 11/1959 | Habsburg-Lothringen et al. |
| 4,017,827 A | * | 4/1977 | Brodesser .................. 340/81 R |
| 4,800,471 A | * | 1/1989 | Lippert ......................... 362/80 |
| 5,727,865 A | * | 3/1998 | Caldwell ....................... 362/80 |
| 5,769,526 A | * | 6/1998 | Shaffer ......................... 362/80 |
| 6,053,627 A | * | 4/2000 | Vo et al. ..................... 362/485 |
| 6,186,653 B1 | * | 2/2001 | Tyves et al. ................. 362/549 |

* cited by examiner

*Primary Examiner*—Sandra O'Shea
*Assistant Examiner*—Jacob Y. Choi
(74) *Attorney, Agent, or Firm*—Carter & Schnedler, P.A.

(57) ABSTRACT

There is provided a supplemental backup lighting apparatus adapted to be connected to a vehicle's trailer hitch. The apparatus includes a housing formed from first and second partial shells. The first partial shell includes first and second openings for receiving a pair of lamp assemblies. Preferably, a shank is attached to the second partial shell and extends away therefrom. The shank is engageable with the vehicle's trailer hitch for securing the supplemental reverse lighting apparatus to the vehicle.

11 Claims, 7 Drawing Sheets

SUPPLEMENTAL REVERSE LIGHTING APPARATUS FOR MOTOR VEHICLES

BACKGROUND OF THE INVENTION

This invention relates to reverse lighting systems for vehicles. More particularly, it relates to supplemental reverse lighting systems for vehicles which have trailer hitches.

All motor vehicles have both front and reverse lighting systems. Front lighting systems normally use high output seal beam lights which provide adequate illumination when the vehicle is moving forward. However, reverse lighting systems for vehicles have much to be desired. Factory installed reverse lights are very dim as compared to front lights. A typical reverse light uses a 35 watt bulb. This low light makes it very difficult for the driver to see past the rear of the vehicle at night. This can present a very hazardous situation. Thus, there is a need for a supplemental reverse lighting system which overcomes these disadvantages.

OBJECTS OF THE INVENTION

It is, therefore, one object of this invention to provide a supplemental reverse lighting system for vehicles to provide adequate illumination.

It is another object of this invention to provide a supplemental reverse lighting system for vehicles which is easy to install.

It is a further object of this invention to provide a supplemental reverse lighting system for vehicles which may be readily mounted onto the trailer hitch of the vehicle.

It is still another object of this invention to provide a supplemental reverse lighting system for vehicles which may be electrically integrated with the vehicle's factory reverse lights.

It is yet another object of this invention to provide a supplemental reverse lighting system which is far safer than factory installed reverse lighting systems, which is inexpensive, easy to install and easy to use.

SUMMARY OF THE INVENTION

In accordance with one form of this invention there is provided a supplemental reverse lighting apparatus for a motor vehicle. The apparatus is configured to be connected to a vehicle's trailer hitch. The apparatus includes a housing. The housing has at least one opening therein. A lamp assembly is provided. A portion of the lamp assembly is received in the opening. A shank is provided. The shank extends from the housing. The shank is engageable with the vehicle's trailer hitch for securing the apparatus to the vehicle.

Preferably, the housing includes first and second partial shells, which are attachable and removable from one another. Preferably, the first partial shell also includes a second opening for receiving a second lamp assembly.

In addition, it is preferred that the openings are in two separate non-coplanar sections on the front of the first partial section, whereby the planes formed by the outside surfaces of the two sections face below and away from the longitudinal axis of the shank so that light from the lamp assemblies will provide useful illumination beyond the rear of the vehicle.

Furthermore, it is preferred that a resilient bezel surrounds the shank adjacent to the housing for reducing the transfer of vibrations from the vehicle to the housing, and thus, to the lamp assemblies.

In accordance with another form of this invention, there is provided a supplemental reverse lighting apparatus for a motor vehicle. The apparatus is configured to be connected to the rear of the vehicle. The apparatus includes a housing. The housing has at least one opening therein. A lamp assembly is provided. A portion of the lamp assembly is received in the opening. The housing includes first and second partial shells. The first and second partial shells are removable from one another. The first opening is in the first partial shell.

It is preferred that the lamp assembly includes an illumination bulb so that the user may be better able to see while backing the vehicle, as well as a strobe bulb to provide a warning any other vehicles which may be approaching from the rear.

BRIEF DESCRIPTION OF THE DRAWINGS

The subject matter which is regarded as the invention is set forth in the appended claims. The invention itself, however, together with further objects and advantages thereof may be better understood in reference to the accompanying drawings in which:

DESCRIPTION OF THE PREFERRED EMBODIMENT

Figure 1:
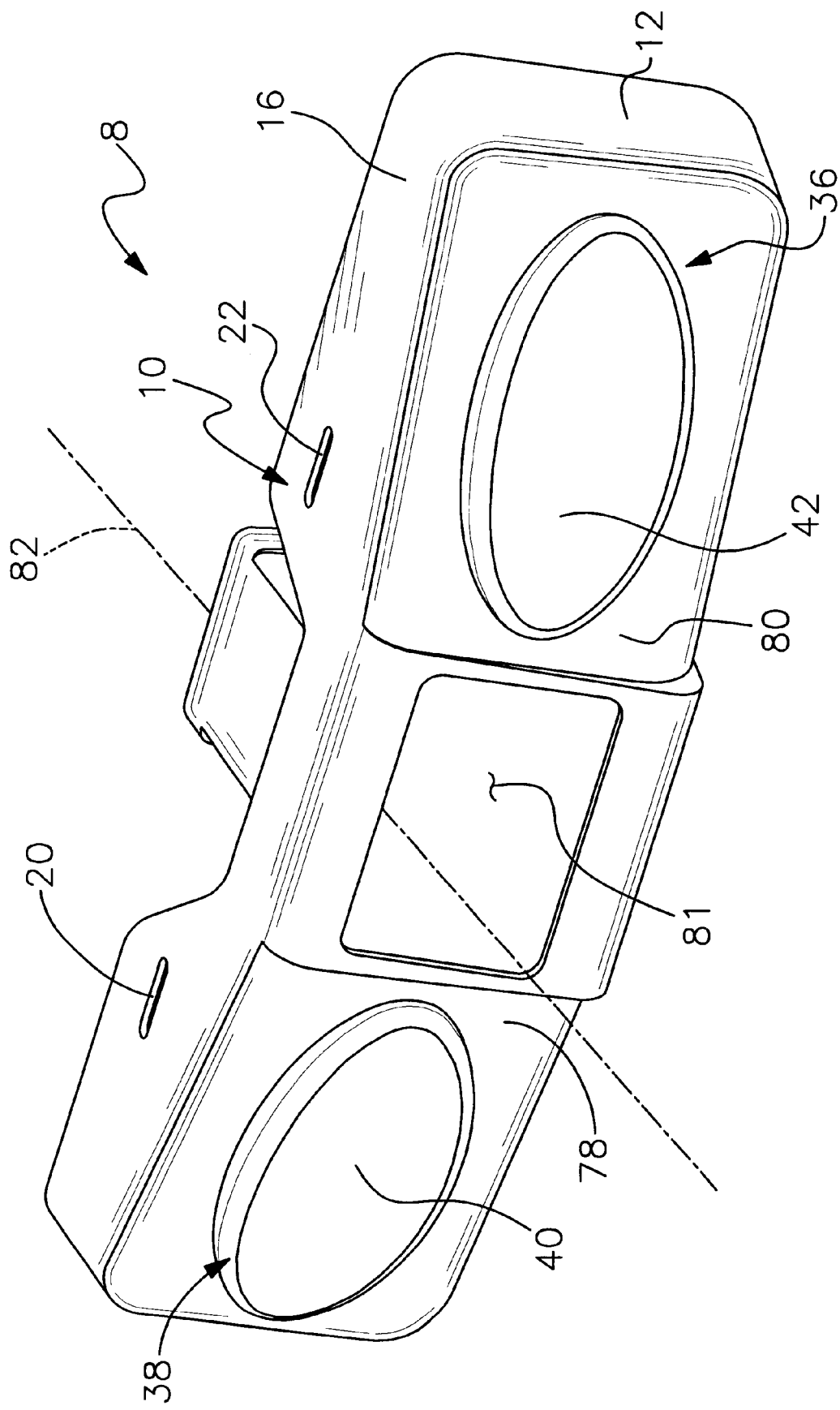
FIG. 1 is a front perspective view showing one embodiment of the apparatus of the subject invention.
Figure 2:
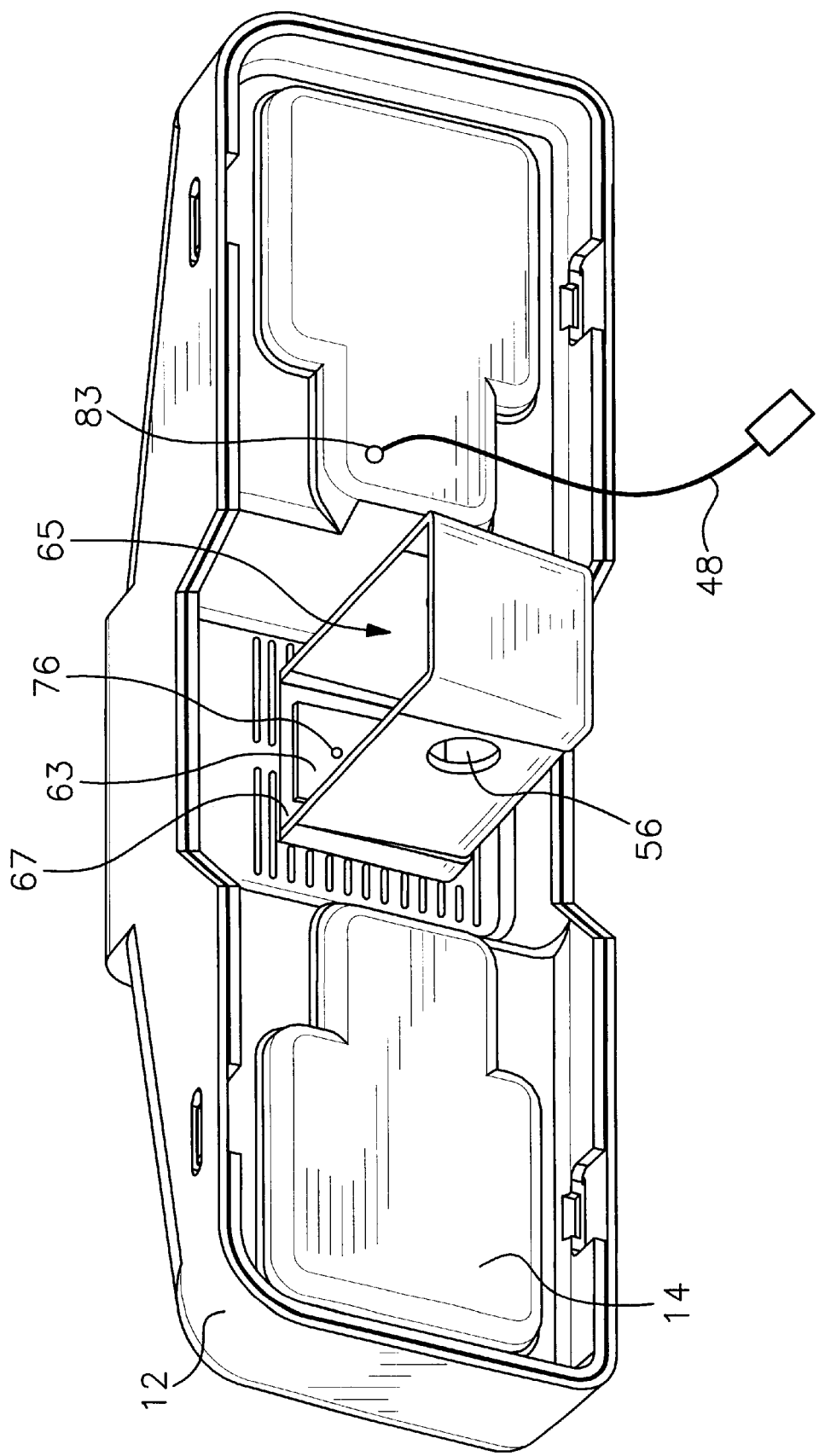
FIG. 2 is a rear perspective view of the apparatus of FIG. 1.
Figure 4:
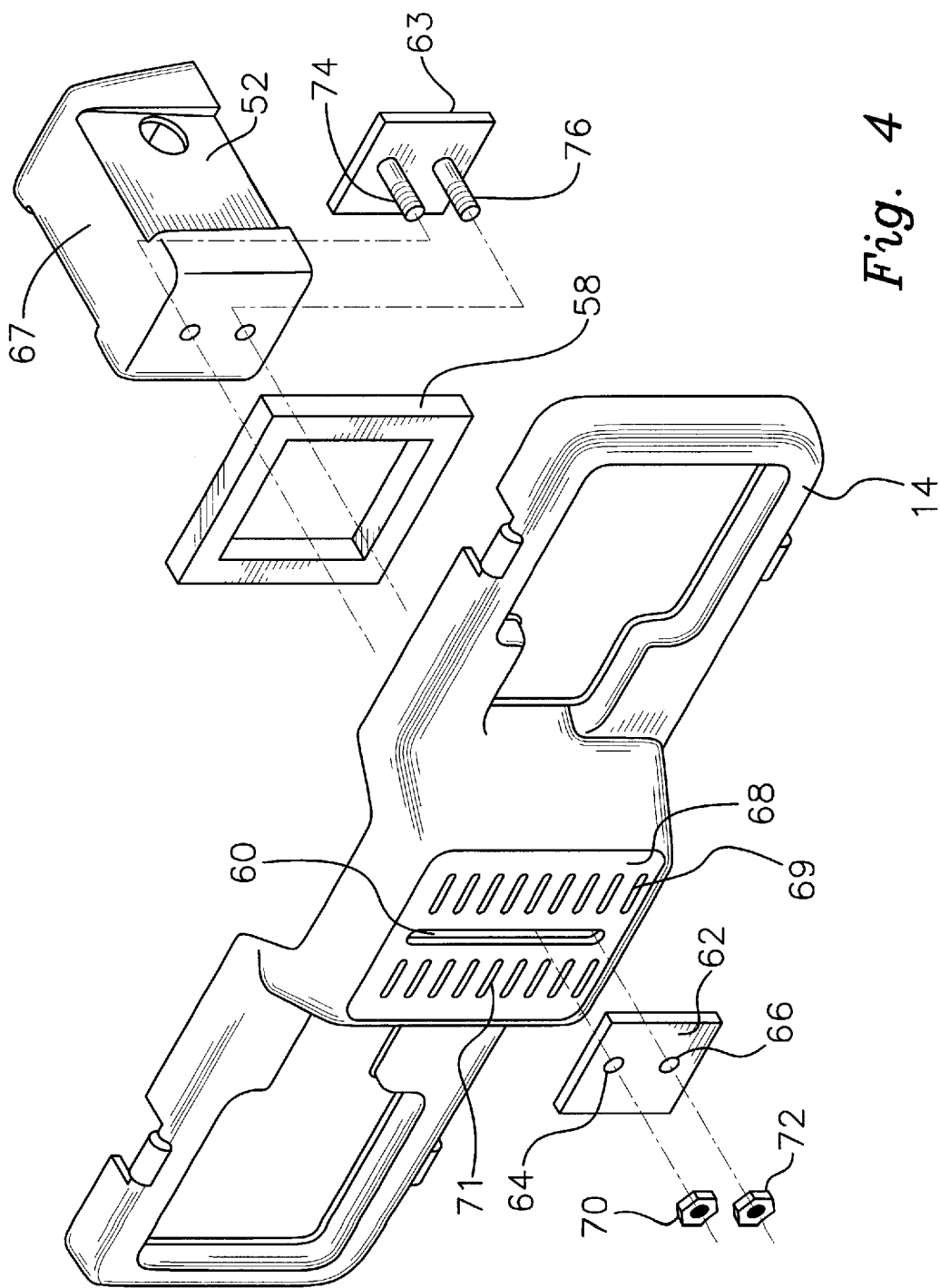
FIG. 4 is an exploded front perspective view of the second partial shell shown in FIG. 2.
Figure 5:
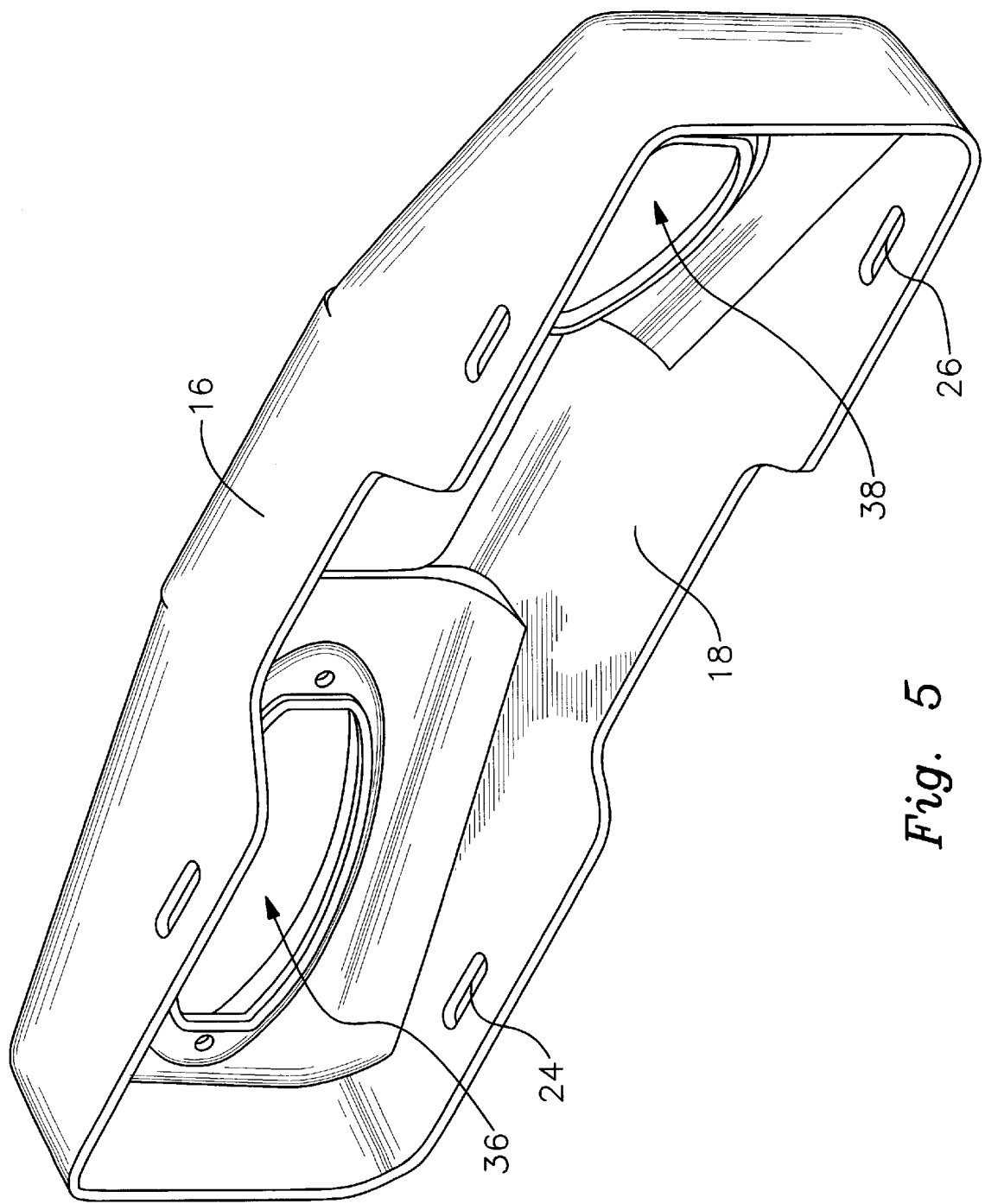
FIG. 5 is a rear perspective view of the inside of the first partial shell shown in FIG. 1, with the lamp assemblies removed.

Referring now more particularly to FIG. 1, there is provided a supplemental reverse lighting apparatus 8 including housing 10. Housing 10 includes first partial shell 12, as shown in FIG. 5, and a second partial shell 14, as shown in FIG. 4. Preferably, the first and second partial shells are fabricated or thermoformed using plastic materials, such as ABS. The first and second partial shells are attached to one another, as shown in FIG. 2. The first partial shell 12 includes top wall 16 and bottom wall 18. Top wall 16 includes first slot 20 and second slot 22. Bottom wall 18 includes third slot 24 and fourth slot 26. Second partial shell 14 includes projections 28, 30, 32 and 34, which engage with slots 20, 22, 24 and 26 so that the first and second shells may readily be attached to another and detached from one another.

First partial shell 12 includes first opening 36 and second opening 38. Clear lens 40, which is part of lamp assembly 44, is received over the outside of opening 38 and clear lens 42, which is part of lamp assembly 46, is received over the outside of opening 36.

Figure 6:
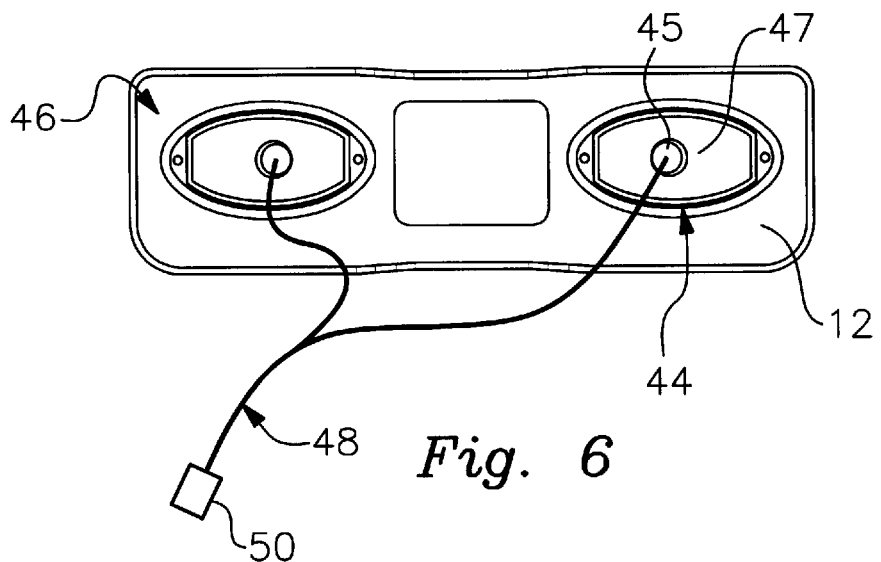
FIG. 6 is a rear elevational view of the apparatus of FIG. 5, except that the lamp assemblies and the wiring harness are shown.

As seen from FIG. 6, lamp assembly 44, which includes an illumination bulb 45 and reflector 47, is received at the inside of opening 38. Lamp assembly 46, which also includes an illumination bulb and reflector, is received at the inside of opening 36. Preferably each lamp assembly produces 55 watts. The lamp assemblies 44 and 46 are electrically connected to wiring harness 48. Wiring harness 48 includes connector 50, which may be connected to the vehicle's standard reverse lighting electrical system.

Figure 10:
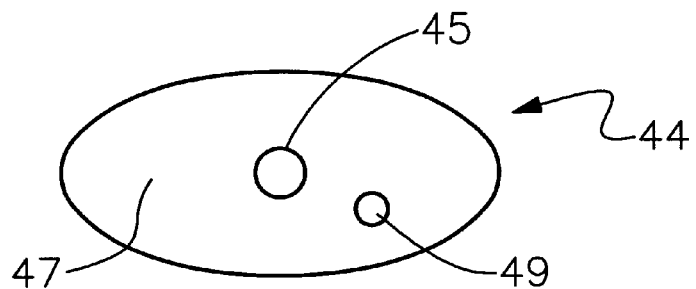
FIG. 10 is a front perspective view of an alternative embodiment of the lamp assembly shown in FIG. 9.
Figure 11:
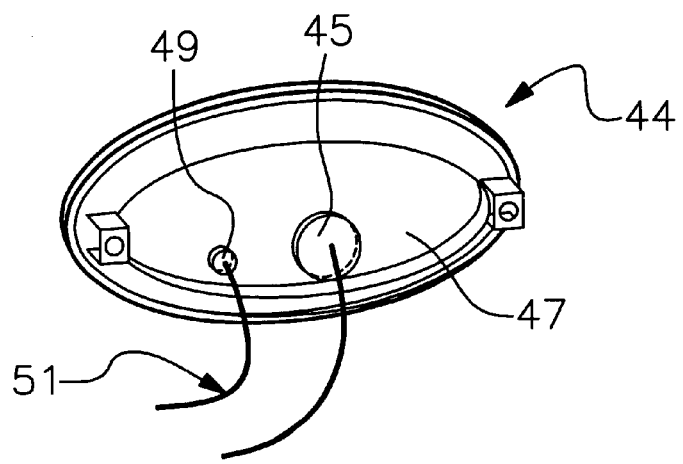
FIG. 11 is a rear perspective view of the lamp assembly of FIG. 10.

As an added safety measure, it is desirable for the lamp assembly 44 to include a strobe bulb 49, as shown in FIGS. 10 and 11. Strobe bulb 49 is connected to wires 51, which are in turn connected to wiring harness 48. Wires 51 are also connected to a switch (not shown) so that the strobe bulb can be activated by the user of the vehicle. Strobe bulb 49 would be activated by the user of the vehicle when it is desirable to warn others that they are approaching the rear of the vehicle during certain conditions, such as when there is fog or when the vehicle is stopped on the edge of a high speed highway. Strobe bulb 49 is installed in a hole reflector 47.

Figure 3:
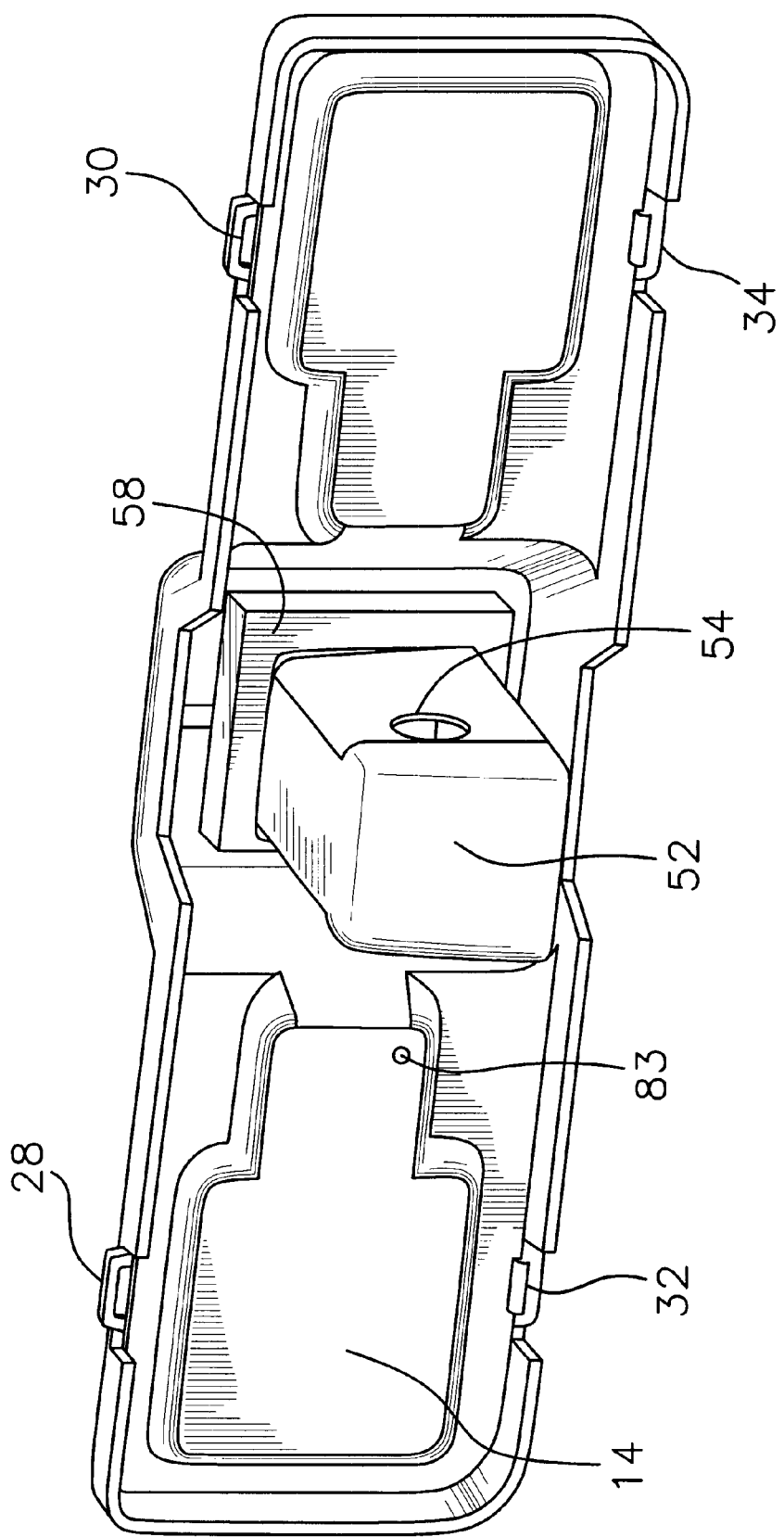
FIG. 3 is a rear perspective view of the second partial shell of the apparatus shown in FIG. 2.

Referring now more particularly to FIGS. 2, 3 and 4, shank 52 is attached to second partial shell 14. The shank is adapted to be received in the opening of a standard trailer hitch (not shown). Shank 52 includes aligned holes 54 and 56 for receiving a retainer pin (not shown) to retain the shank onto the trailer hitch. The outside dimensions of the shank are only slightly less than the inside dimensions of the hitch opening so that the shank tightly fits within the trailer hitch opening. A resilient bezel 58 is received about the outer periphery of the shank where the shank is attached to the second partial shell so as to reduce the transmission of vibrations from the vehicle to the housing 10, and thus, to the lamp assemblies 44 and 46. Preferably, the bezel is made of an open cell foam compressible material.

As can be seen from FIG. 4, second partial shell 14 includes vertical slit 60 for permitting shank 52 to be adjusted vertically. A first metal plate 62, having holes 64 and 66 therein, fits against wall 68 of second partial shell 14. A second metal plate 63 having threaded studs 74 and 76 projecting therefrom is received inside the hollow portion 65 of shank 52 against wall 67. Studs 74 and 76 extend through a pair of holes in wall 67. Studs 74 and 76 pass through slit 60 and holes 64 and 66 in first plate 62. A pair of nuts 70 and 72 are received on studs 74 and 76. With the nuts 70 and 72 tightened onto studs 74 and 76, shank 52 is firmly but adjustably attached to second partial shell 14.

Wall 68 of second partial shell 14 includes a plurality to of ribs 69 and 71, which are embossed or otherwise formed therein to add strength to wall 68.

Figure 7:
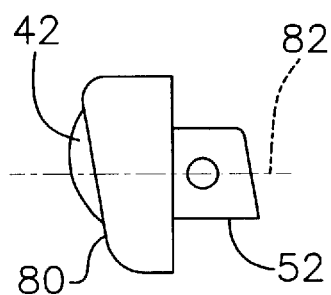
FIG. 7 is a side elevational view of the apparatus of FIG. 1.
Figure 8:
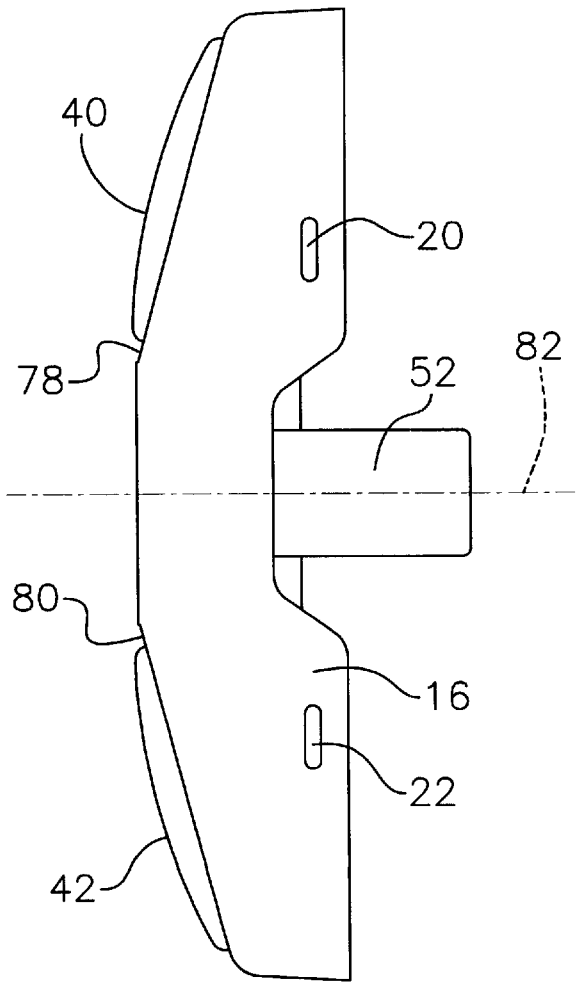
FIG. 8 is a top plan view of the apparatus of FIG. 1.
Figure 9:
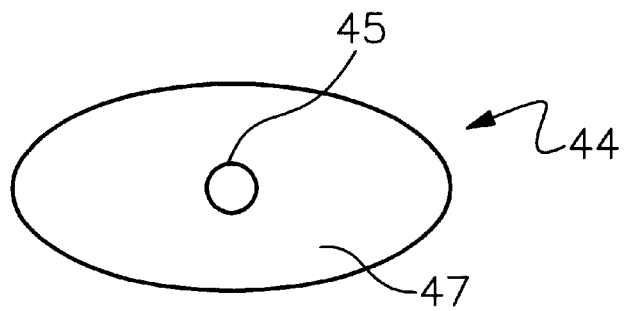
FIG. 9 is a front elevational view of one of the lamp assemblies of FIG. 6.

Referring now more particularly to FIGS. 1, 7 and 8, the front of first partial shell 12 includes first section 78 and second section 80, which are non-coplanar outside front surfaces of first partial shell 12. Dotted line 82 represents the longitudinal axis of shank 52. Sections 78 and 80 face below and away from longitudinal axis 82 of shank 52. Thus, lamp assemblies 44 and 46 point down from and away from longitudinal axis 82 of shank 52, and thus, down and away from the center of the back of the vehicle so that useful illumination is provided past the rear of the vehicle.

Since the first and second partial shells are, preferably, made of ABS, which is strong but resilient, the second partial shell may be easily snap fitted onto and removed from the first partial shell by means of projections 28, 30, 32 and 34, and slots 20, 22, 24 and 26. The first and second partial shells are tightly connected together to reduce the likelihood that dust, moisture and other materials will enter into the inside of housing 10. A third flat section 81 is located between first section 78 and second section 80. The third section is adapted to receive various indicia, such as the name of a vehicle manufacturer. Hole 83 is provided in second partial shell 14 for receiving wiring harness 48.

Thus, there is provided an inexpensive, easy to install and easy to use supplemental reverse lighting system. This supplemental reverse lighting system provides much greater illumination past the rear of the vehicle during reverse than a factory installed reverse lighting system.

From the foregoing description of the preferred embodiments of the invention, it will be apparent that many modifications may be made therein. It should be understood that the illustrated embodiments of the invention are exemplifications of the invention only and that the invention is not limited thereto. For example, shank 52 could be eliminated and wall 68 of the second partial shell could be removed to permit the vehicle trailer hitch to extend therethrough. It is to be understood therefore that it is intended in the appended claims to cover all modifications as fall within the true spirit and scope of the invention.

What is claimed is:

1. A supplemental reverse lighting apparatus adapted to be connected to a vehicle's trailer hitch comprising:

a housing; said housing having at least a first opening therein;

a lamp assembly; said lamp assembly adapted to be electrically connected to the vehicle's reverse lighting circuit; a portion of said lamp assembly received in said first opening;

a shank; said shank extending from said housing; said shank engageable with the vehicle's trailer hitch for securing the apparatus to the vehicle;

a second opening in said housing;

a second lamp assembly, a portion of said second lamp assembly received in said second opening;

said housing includes first and second partial shells; said first and second partial shells removable from one another; said first and second openings being in said first partial shell; said shank extending from said second partial shell;

said first partial shell has a front wall; said first and second openings being in said front wall; said front wall having first and second non-coplanar sections; said first opening being in said first section and said second opening being in said second section; said first and second sections being on opposite sides of the longitudinal axis of said shank; the planes formed by the outside surfaces of said first and second sections facing below and away from the longitudinal axis of said shank, whereby light from said lamp assemblies will provide useful illumination past the rear of the vehicle.

2. A supplemental reverse lighting apparatus adapted to be connected to a vehicle's trailer hitch comprising:

a housing; said housing having at least a first opening therein;

a lamp assembly; said lamp assembly adapted to be electrically connected to the vehicle's reverse lighting circuit; a portion of said lamp assembly received in said first opening;

a shank; said shank extending from said housing; said shank engageable with the vehicle's trailer hitch for securing the apparatus to the vehicle;

a resilient bezel; said resilient bezel surrounding said shank adjacent to said housing for reducing the transfer of vibrations from the vehicle to said housing.

3. An apparatus as set forth in claim 1, wherein said shank is configured to be received in an opening in the trailer hitch.

4. An apparatus as set forth in claim 1, wherein said housing includes first and second partial shells; said shank removably attached to said second partial shell.

5. An apparatus as set forth in claim 1, further including a third section located between said first and second sections; said third section adapted to received various indicia.

6. An apparatus as set forth in claim 1, further including a wiring harness; said wiring harness attached to said lamp assemblies.

7. An apparatus as set forth in claim 1, wherein said second partial shell has a vertical adjustment slot; a first plate; said first plate contacting said shank; at least one threaded stud attached to first plate; said stud passing through said vertical adjustment slot, whereby said shank may be adjusted vertically.

8. An apparatus as set forth in claim 7, further including a second plate; said plate having at least one hole therein for receiving said stud; said second plate located on the opposite side of said second partial shell from said shank; a nut; said nut received on said stud for securing said shank to said second partial shell.

9. An apparatus as set forth in claim 1, wherein said first partial shell has top and bottom walls; said top wall having first and second slots; said bottom wall having third and fourth slots; said second partial shell having first, second, third and fourth projections; said first, second, third and fourth projections respectively removably engageable with said first, second, third and fourth slots for attaching said first partial shell to said second partial shell and for permitting said first and second partial shells to be readily detached from one another.

10. An apparatus as set forth in claim 7, wherein a plurality of ribs are formed adjacent to each side of said vertical slot for adding strength to said second partial shell.

11. An apparatus as set forth in claim 1, wherein said lamp assembly includes an illumination bulb and a strobe bulb.

\* \* \* \* \*